US008261940B2

(12) United States Patent
Pfister et al.

(10) Patent No.: US 8,261,940 B2
(45) Date of Patent: Sep. 11, 2012

(54) VENDING DISPENSER ASSEMBLIES FOR BEVERAGE DISPENSERS

(75) Inventors: Steven C. Pfister, Dunwoody, GA (US); Craig J. Cochran, Atlanta, GA (US); Kirk W. Charles, Austell, GA (US)

(73) Assignee: The Coca-Cola Company, Atlanta, GA (US)

( * ) Notice: Subject to any disclaimer, the term of this patent is extended or adjusted under 35 U.S.C. 154(b) by 1416 days.

(21) Appl. No.: 11/697,534

(22) Filed: Apr. 6, 2007

(65) Prior Publication Data

US 2008/0245820 A1 Oct. 9, 2008

(51) Int. Cl.
*G07F 11/16* (2006.01)
*B65G 59/00* (2006.01)

(52) U.S. Cl. ........ 221/254; 221/249; 221/192; 221/256; 221/233; 221/236; 221/123

(58) Field of Classification Search .............. 221/1, 123, 221/124, 129, 133, 265, 295, 273, 97, 249, 221/190, 192, 254, 256, 233, 236
See application file for complete search history.

(56) References Cited

U.S. PATENT DOCUMENTS 1,234,766 A * 7/1917 James ............................ 221/97
1,369,440 A * 2/1921 Jones ............................ 221/97
1,626,429 A * 4/1927 Ruoff ............................ 194/254
1,695,956 A * 12/1928 Frick ............................ 221/97
RE18,291 E * 12/1931 Kaye ............................ 221/97
2,156,196 A 4/1939 Romanoski
3,810,560 A 5/1974 Stegeman
4,576,272 A * 3/1986 Morgan et al. ................ 194/215
5,148,944 A * 9/1992 Kaufman et al. ............. 221/131
5,247,798 A * 9/1993 Collard, Jr. .................... 62/3.62
5,356,033 A 10/1994 Delaney
6,168,046 B1 * 1/2001 Galesi ........................... 221/251
6,173,582 B1 * 1/2001 Hixson ........................ 62/457.4
6,234,345 B1 * 5/2001 Minh et al. .................... 221/124
6,390,328 B1 * 5/2002 Obermeier et al. ........... 221/203
6,494,342 B1 12/2002 Wittern et al.
2005/0150900 A1 7/2005 Byrne et al.

OTHER PUBLICATIONS

International Preliminary Report on Patentability for PCT/US2008/059346 mailed Mar. 11, 2009.
Applicant's Response to Written Opinion mailed on Oct. 7, 2008.
International Search Report and Written Opinion for PCT/US2008/059346 mailed Oct. 7, 2008.
Australian Office Action for Australian Application No. 2008237287 dated Mar. 8, 2012.

* cited by examiner

*Primary Examiner* — Michael K Collins
(74) *Attorney, Agent, or Firm* — Sutherland Asbill & Brennan LLP

(57) ABSTRACT

Embodiments of the invention provide vending dispenser assemblies for beverage dispensers. In particular, embodiments of the invention can provide a beverage dispenser with a manually operated vending dispenser assembly that consumes little or no additional electrical power to dispense a beverage container using the assembly. Embodiments of a vending dispenser assembly can be used with a heated or chilled compartment associated with a beverage dispenser. Furthermore, embodiments of a vending dispenser assembly can operate in conjunction with a relatively small dispenser opening to limit heat transfer loss via the dispenser opening. One embodiment can provide a dispenser for dispensing a number of products. The dispenser can include at least one storage column adapted to dispense a number of products, and a product selection device operable to permit one of the number of products to advance from the storage column, wherein the advanced product can be dispensed from the dispenser.

12 Claims, 12 Drawing Sheets

VENDING DISPENSER ASSEMBLIES FOR BEVERAGE DISPENSERS

TECHNICAL FIELD

The invention relates generally to a beverage dispenser, and more particularly relates to vending dispenser assemblies for beverage dispensers.

BACKGROUND OF THE INVENTION

Conventional beverage dispensers can dispense pre-packaged beverages in cans, bottles, or other containers. Various concerns exist for such conventional types of dispensers including packout, restocking, power consumption, and consumer access to a dispensed product. Other conventional beverage dispensers can dispense beverages into cups or other containers for distribution to customers. Depending on the location and customer, different types of beverage dispensers can be employed. For example, beverages in cans and bottles can be dispensed from a dispenser located behind a store or restaurant counter or can be obtained from an under the counter refrigerator or storage unit in a store or restaurant. However, in many instances, store or restaurant personnel must walk over to a dispenser where pre-packaged cans or bottles are located. This dispenser-to-consumer process can take time since store or restaurant personnel must often walk to where the dispenser is located. Alternatively, store or restaurant personnel must bend down to access the under the counter refrigerator or storage unit. This dispenser-to-consumer process also takes time since he or she may bend down each time to obtain a beverage, which repeated over time, may cause back pain or stress for personnel.

In other instances, personnel can dispense beverages directly into a cup or other container. However, in many such instances, filling cups or containers takes time, and beverage spillage can be a recurring or occasional problem. In addition, personnel may have to walk over to these types of beverage dispensers in order to dispense each beverage for each customer.

Therefore, a need exists for a beverage dispenser with a vending dispenser assembly that minimizes time in delivering a beverage to a customer. Furthermore, a need exists for a beverage dispenser with a vending dispenser assembly that is convenient to use, and minimizes product wastage. Moreover, a need exists for a beverage dispenser with a vending dispenser assembly with increased packout, and decreased power consumption.

SUMMARY OF THE INVENTION

Embodiments of the invention can address some or all of the needs described above. Generally, embodiments of the invention can provide a beverage dispenser with a vending dispenser assembly. In particular, embodiments of the invention can provide a beverage dispenser with a manually operated vending dispenser assembly that is mechanically reliable and relatively easy to use. Embodiments of a vending dispenser assembly can be used with a heated or chilled compartment associated with a beverage dispenser. Furthermore, embodiments of a vending dispenser assembly can operate in conjunction with a relatively small dispenser opening to limit heat transfer loss via the dispenser opening. In addition, embodiments of a vending dispenser assembly can be manually operated by a person with little or no additional consumption of electrical power to dispense a beverage container using the assembly.

In one embodiment, a beverage dispenser with a vending dispenser assembly can be used with any number of product lanes. For example, a beverage dispenser can be used with two product lanes. Adjacent to the product lanes can be a turret assembly. The turret assembly can include a turret wheel, a product gate, and any number of star-shaped wheels. Adjacent to the turret assembly can be a shuttle assembly. The shuttle assembly can include a shuttle positioned on any number of rails. When a user pulls on the shuttle door, the shuttle can ride along the rails to provide access to the product. When the shuttle door is closed, the product gate can swing forward by the force of gravity such that gate lever pivots and the drive pins allow the turret and the star wheels to rotate and dispense another beverage onto the shuttle. The shuttle can be operated via a drive belt assembly. The drive belt can pull the shuttle forward such that the shuttle is within the door open regardless of how far door is opened.

In another embodiment, a dispenser for dispensing a number of products can include at least one storage column adapted to dispense a number of products. The dispenser can also include a product selection device operable to permit one of the number of products to advance from the storage column, wherein the advanced product can be dispensed from the dispenser.

In one aspect of an embodiment, the product selection device can include a rotatable door.

In another aspect of an embodiment, the product selection device can include at least one turret-type wheel.

In another aspect of an embodiment, the product selection device can include a device with a plurality of slots, wherein each of the plurality of slots is sized to receive one of the number of products.

In yet another aspect of an embodiment, the product selection device can be adapted to permit manual operation of the device.

In another aspect of an embodiment, the product selection device can include an access door, at least one turret-type wheel positioned adjacent to at least one storage column, and a product shuttle cooperating with the door and the at least one turret-type wheel, wherein manipulating the access door causes rotation of the at least one turret-type wheel which allows one of the number of products to advance from the at least one storage column to the product shuttle and towards the access door.

In yet another aspect of an embodiment, the at least one turret-type wheel can include a plurality of slots, wherein each of the plurality of slots is sized to receive one of the number of products.

In yet another aspect of an embodiment, the at least one turret-type wheel comprises a plurality of slots and a plurality of out-of-phase slots, wherein the plurality of slots is sized to receive one of a number of products from a first storage column and the plurality of out-of-phase slots is sized to receive one of a number of products from a different storage column.

In yet another aspect of an embodiment, rotation of the at least one-turret type wheel is controlled by at least one control device.

In yet another aspect of an embodiment, the at least one control device can include at least one of the following: a ratchet gear, a toggle, a pawl, or a pawl trigger.

In yet another aspect of an embodiment, the product shuttle can include a pulley drive set.

In yet another aspect of an embodiment, the product shuttle can be adapted to lift the advanced product when the access door is opened.

In another aspect of an embodiment, the product selection device can include at least one turret-type wheel positioned adjacent to the at least one storage column, and a device cooperating with the at least one turret-type wheel, the device operable to receive a force from a user, wherein the force causes the at least one turret-type wheel to rotate and allows one of the number of products to advance from the at least one storage column.

In another aspect of an embodiment, the at least one turret-type wheel can include a plurality of slots, wherein each of the plurality of slots is sized to receive one of the number of products.

In yet another aspect of an embodiment, the product selection device can include at least one moveable array operable to receive the advanced product, and advance the product towards an access opening, and at least one stationary array adjacent to the at least one moveable array, and operable to retain the position of the advanced product when movement of the advanced product is interrupted prior to dispensing of the product from the access opening.

In another aspect of an embodiment, the at least one moveable array includes at least one of the following: a series of pivotable arms, or a series of lift bars.

In another aspect of an embodiment, the at least one stationary array can include a series of pivotable arms.

In another aspect of an embodiment, the at least one moveable array can be manually operated to dispense the advanced product from the access opening.

Another embodiment of the invention can provide a method of dispensing a product from a dispenser. The method can include selecting a product stored in at least one storage column adapted to dispense a number of products. In addition, the method can include manipulating a product selection device operable to permit one of the number of products to advance from the storage column, wherein the advanced product can be dispensed from the dispenser. Furthermore, the method can include receiving the selected product from the dispenser.

In one aspect of an embodiment, the product selection device can include a rotatable door.

In another aspect of an embodiment, the product selection device can include at least one turret-type wheel.

In yet another aspect of an embodiment, the product selection device can include a device with a plurality of slots, wherein each of the plurality of slots is sized to receive one of the number of products.

In yet another aspect of an embodiment, the product selection device can be adapted to permit manual operation of the device.

In yet another aspect of an embodiment, the product selection device can include an access door, at least one turret-type wheel positioned adjacent to at least one storage column, and a product shuttle cooperating with the door and the at least one turret-type wheel, wherein manipulating the access door causes rotation of the at least one turret-type wheel which allows one of the number of products to advance from the at least one storage column to the product shuttle and towards the access door.

In yet another aspect of an embodiment, the at least one turret-type wheel can include a plurality of slots, wherein each of the plurality of slots is sized to receive one of the number of products.

In yet another aspect of an embodiment, the at least one turret-type wheel can include a plurality of slots and a plurality of out-of-phase slots, wherein the plurality of slots is sized to receive one of a number of products from a first storage column and the plurality of out-of-phase slots is sized to receive one of a number of products from a different storage column.

In yet another aspect of an embodiment, rotation of the at least one-turret type wheel is controlled by at least one control device.

In yet another aspect of an embodiment, the at least one control device can include at least one of the following: a ratchet gear, a toggle, a pawl, or a pawl trigger.

In yet another aspect of an embodiment, the product shuttle can include a pulley drive set.

In yet another aspect of an embodiment, the product shuttle is adapted to lift the advanced product when the access door is opened.

In yet another aspect of an embodiment, the product selection device can include at least one turret-type wheel positioned adjacent to the at least one storage column, and a device cooperating with the at least one turret-type wheel, the device operable to receive a force from a user, wherein the force causes the at least one turret-type wheel to rotate and allows one of the number of products to advance from the at least one storage column.

In yet another aspect of an embodiment, the at least one turret-type wheel can include a plurality of slots, wherein each of the plurality of slots is sized to receive one of the number of products.

In yet another aspect of an embodiment, the product selection device can include at least one moveable array operable to receive the advanced product, and advance the product towards an access opening, and at least one stationary array adjacent to the at least one moveable array, and operable to retain the position of the advanced product when movement of the advanced product is interrupted prior to dispensing of the product from the access opening.

In yet another aspect of an embodiment, the at least one moveable array can include at least one of the following: a series of pivotable arms, or a series of lift bars.

In yet another aspect of an embodiment, the at least one stationary array can include a series of pivotable arms.

In yet another aspect of an embodiment, the at least one moveable array can be manually operated to dispense the advanced product from the access opening.

Another embodiment of the invention can provide a method of providing a product from a dispenser. The method can include storing at least one product in at least one storage column adapted to dispense a number of products. Furthermore, the method can include providing a product selection device operable to permit one of the number of products to advance from the storage column, wherein the advanced product can be dispensed from the dispenser. Moreover, the method can include after receipt of an input from a consumer, dispensing the advanced product from the dispenser.

In one aspect of an embodiment, the product selection device can include a rotatable door.

In yet another aspect of an embodiment, the product selection device can include at least one turret-type wheel.

In yet another aspect of an embodiment, the product selection device can include a device with a plurality of slots, wherein each of the plurality of slots is sized to receive one of the number of products.

In yet another aspect of an embodiment, the product selection device is adapted to permit manual operation of the device.

In yet another aspect of an embodiment, the product selection device can include an access door, at least one turret-type wheel positioned adjacent to at least one storage column, and a product shuttle cooperating with the door and the at least one turret-type wheel, wherein manipulating the access door causes rotation of the at least one turret-type wheel which allows one of the number of products to advance from the at least one storage column to the product shuttle and towards the access door.

In yet another aspect of an embodiment, the at least one turret-type wheel can include a plurality of slots, wherein each of the plurality of slots is sized to receive one of the number of products.

In yet another aspect of an embodiment, the at least one turret-type wheel can include a plurality of slots and a plurality of out-of-phase slots, wherein the plurality of slots is sized to receive one of a number of products from a first storage column and the plurality of out-of-phase slots is sized to receive one of a number of products from a different storage column.

In yet another aspect of an embodiment, rotation of the at least one-turret type wheel is controlled by at least one control device.

In yet another aspect of an embodiment, the at least one control device can include at least one of the followings a ratchet gear, a toggle, a pawl, or a pawl trigger.

In yet another aspect of an embodiment, the product shuttle can include a pulley drive set.

In yet another aspect of an embodiment, the product shuttle is adapted to lift the advanced product when the access door is opened.

In yet another aspect of an embodiment, the product selection device can include at least one turret-type wheel positioned adjacent to the at least one storage column, and a device cooperating with the at least one turret-type wheel, the device operable to receive a force from a user, wherein the force causes the at least one turret-type wheel to rotate and allows one of the number of products to advance from the at least one storage column.

In yet another aspect of an embodiment, the at least one turret-type wheel can include a plurality of slots, wherein each of the plurality of slots is sized to receive one of the number of products.

In yet another aspect of an embodiment, the product selection device can include at least one moveable array operable to receive the advanced product, and advance the product towards an access opening, and at least one stationary array adjacent to the at least one moveable array, and operable to retain the position of the advanced product when movement of the advanced product is interrupted prior to dispensing of the product from the access opening.

In yet another aspect of an embodiment, the at least one moveable array can include at least one of the following: a series of pivotable arms, or a series of lift bars.

In yet another aspect of an embodiment, the at least one stationary array can include a series of pivotable arms.

In yet another aspect of an embodiment, the at least one moveable array can be manually operated to dispense the advanced product from the access opening.

Yet another embodiment of the invention can provide a dispenser for dispensing a number of products. The dispenser can include at least one storage column adapted to dispense a number of products. Furthermore, the dispenser can include a product selection device operable to permit one of the number of products to advance from the storage column, wherein the advanced product can be dispensed from the dispenser, the product selection device comprising at least one turret-type wheel positioned adjacent to at least one storage column. Moreover, the dispenser can include an access opening, and a product shuttle cooperating with the door and the at least one turret-type wheel, wherein manipulating the access door causes rotation of the at least one turret-type wheel which allows one of the number of products to advance from the at least one storage column to the product shuttle and towards the access opening.

Another embodiment of the invention provides a dispenser for dispensing a number of products. The dispenser includes at least one storage column adapted to dispense a number of products. In addition, the dispenser provides a product selection device operable to permit one of the number of products to advance from the storage column, wherein the advanced product can be dispensed from the dispenser. The product selection device can include at least one turret-type wheel positioned adjacent to the at least one storage column. In addition, the product selection device can include a device cooperating with the at least one turret-type wheel, the device operable to receive a force from a user, wherein the force causes the at least one turret-type wheel to rotate and allows one of the number of products to advance from the at least one storage column towards the access opening, Moreover, the product selection device can include an access opening for dispensing the advanced product.

Yet another embodiment of the invention can provide a dispenser for dispensing a number of products. The dispenser can include at least one storage column adapted to dispense a number of products. In addition, the dispenser can include a product selection device operable to permit one of the number of products to advance from the storage column, wherein the advanced product can be dispensed from the dispenser. The product selection device can include at least one moveable array operable to receive the advanced product, and advance the product towards an access opening. In addition, the product selection device can include at least one stationary array adjacent to the at least one moveable array, and operable to retain the position of the advanced product when movement of the advanced product is interrupted prior to dispensing of the product from the access opening. Moreover, the product selection device can include an access opening for dispensing the advanced product.

Other embodiments and aspects of embodiments of the invention will become apparent from the following description taken in conjunction with the accompanying drawings.

BRIEF DESCRIPTION OF THE DRAWINGS

Figure 1:
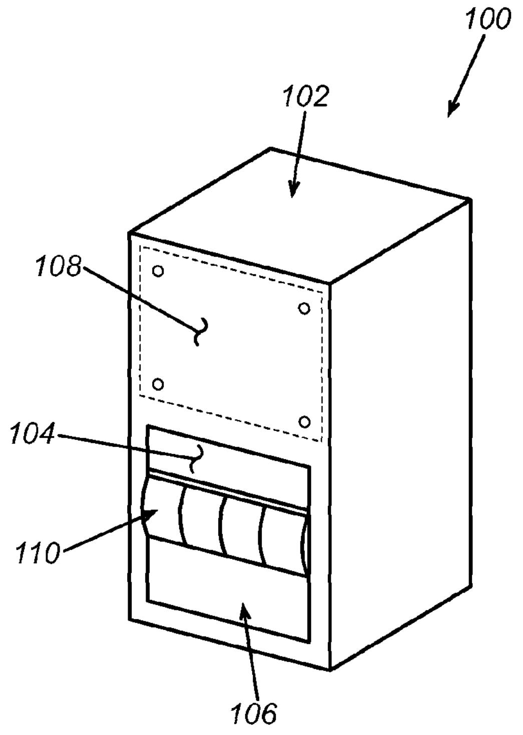

Having thus described the invention in general terms, reference will now be made to the accompanying drawings, which are not necessarily drawn to scale, and wherein:

FIG. 1 is a perspective view of an example stand alone-type beverage dispenser with a vending dispenser assembly according to an embodiment of the invention.

Figure 2:
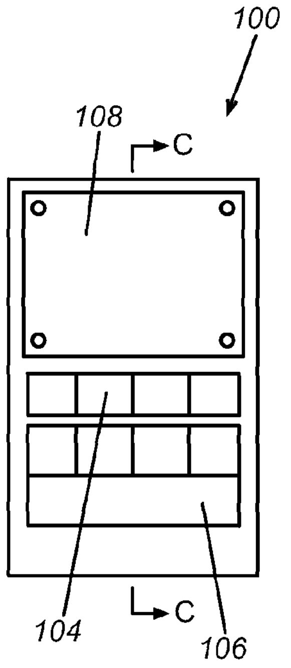

FIG. 2 is a front view of the stand alone-type beverage dispenser with a vending dispenser assembly shown in FIG. 1.

Figure 3:
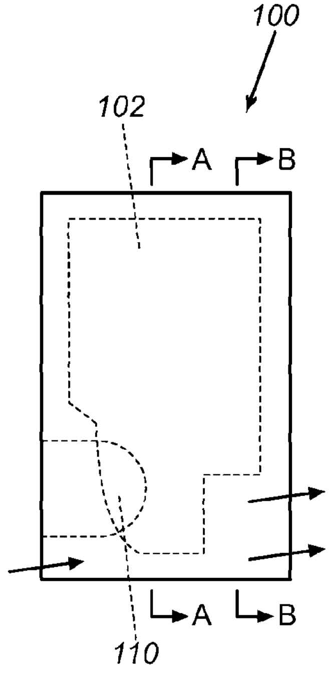

FIG. 3 is a side view of the stand alone-type beverage dispenser with a vending dispenser assembly shown in FIG. 1.

Figure 4:
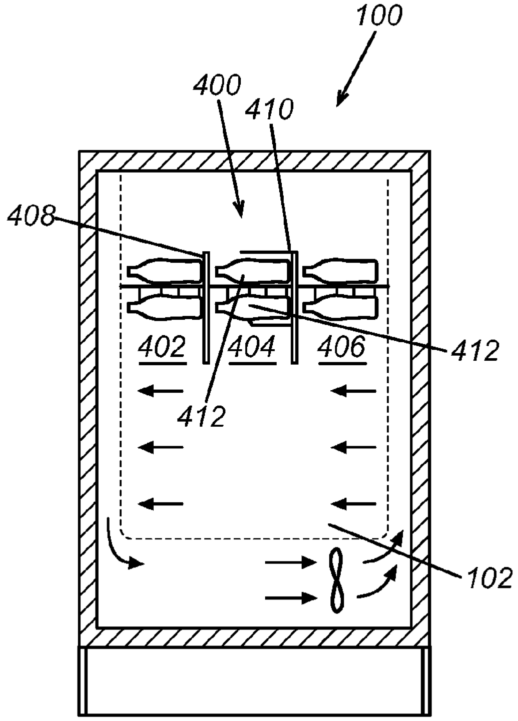

FIG. 4 is a front sectional view of the stand alone-type beverage dispenser with a vending dispenser assembly shown in FIG. 1.

Figure 5:
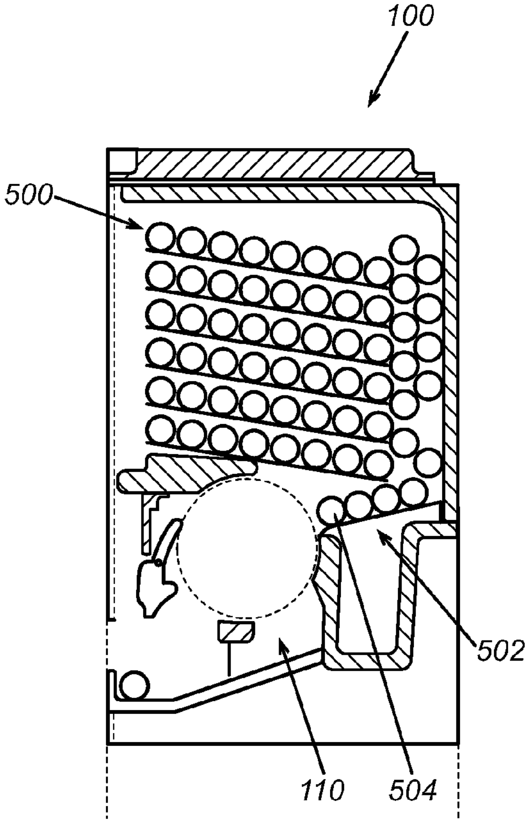

FIG. 5 is a side sectional view of the stand alone-type beverage dispenser with a vending dispenser assembly shown in FIG. 1.

Figure 6:
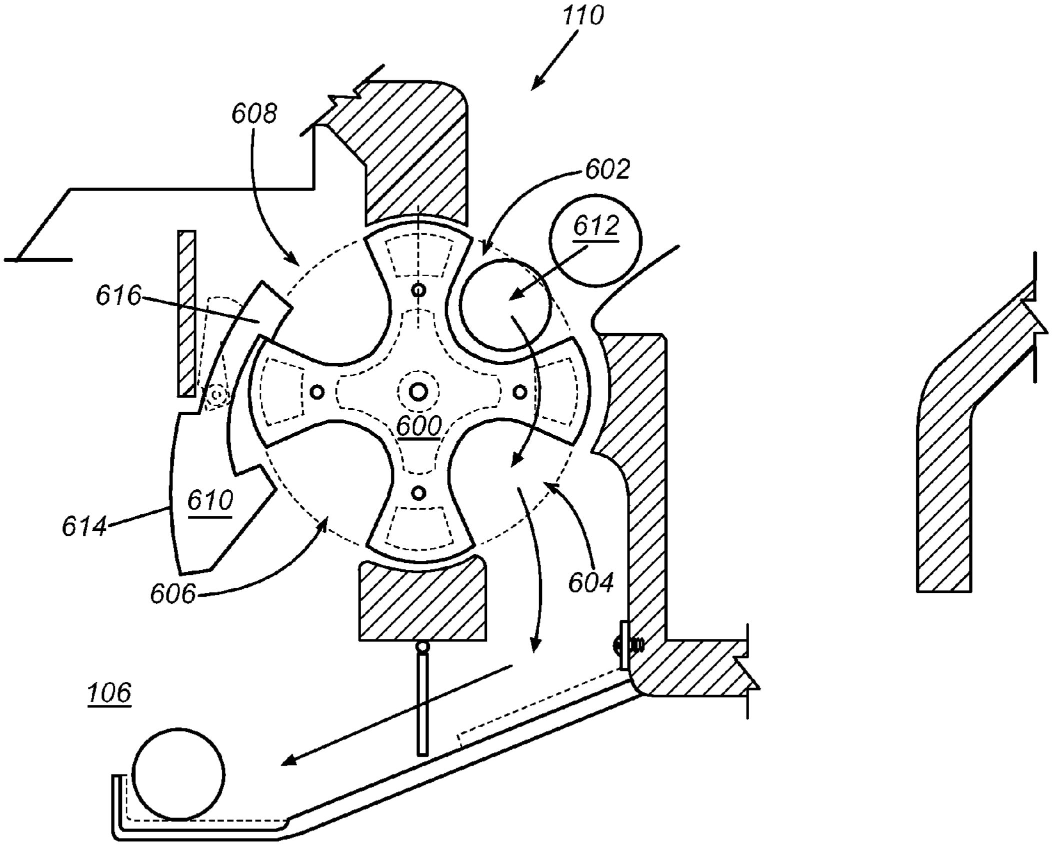

FIG. 6 is a detail schematic view of an example vending dispenser assembly for the stand alone beverage dispenser shown in FIGS. 1-5.

Figure 7A:
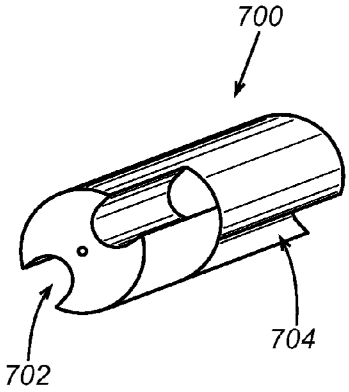
Figure 7B:
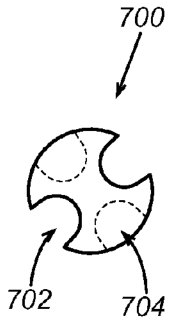

FIGS. 7A and 7B illustrate an example rotatable device or turret for a vending dispenser assembly in accordance with an embodiment of the invention.

Figure 8:
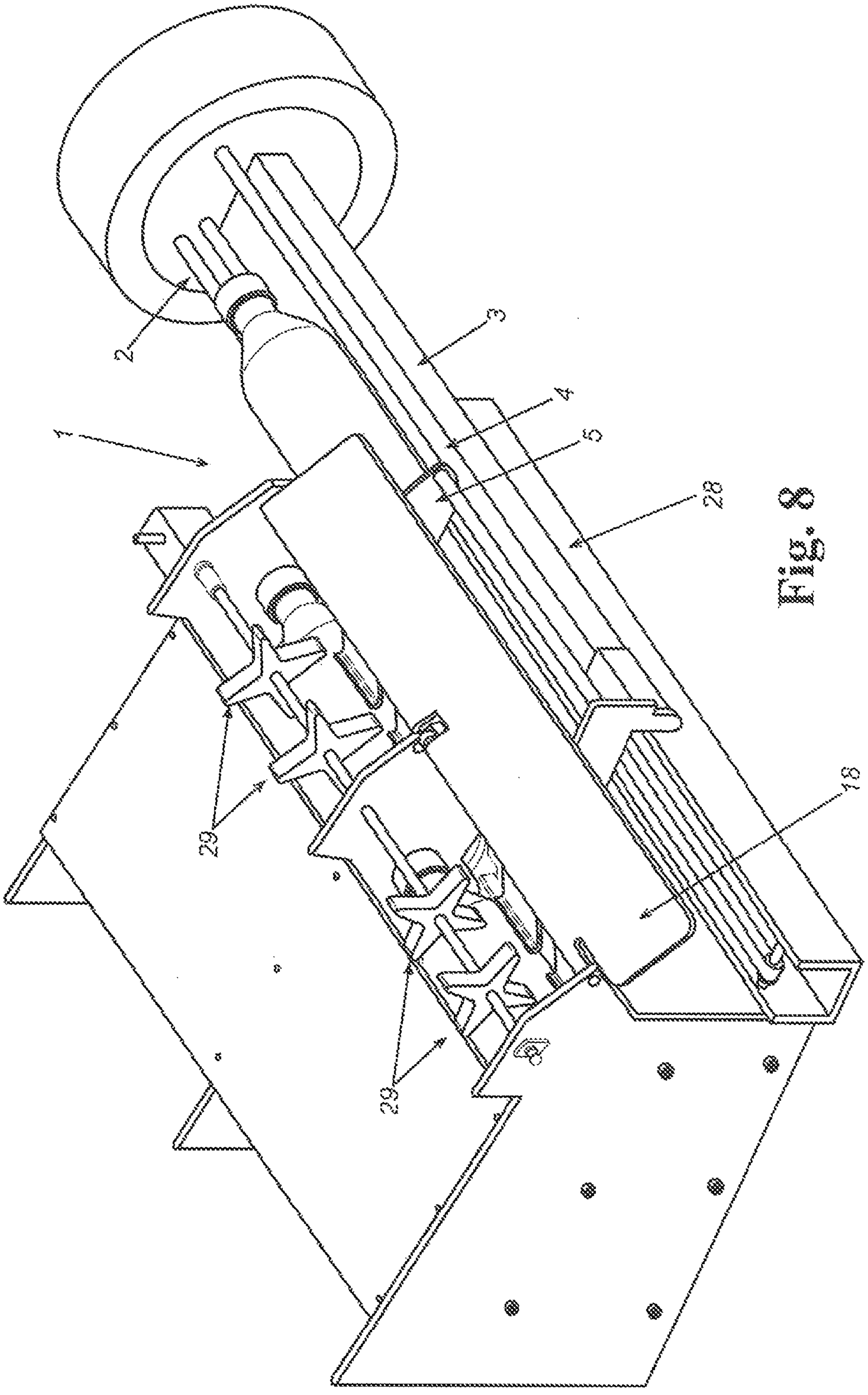
Figure 9:
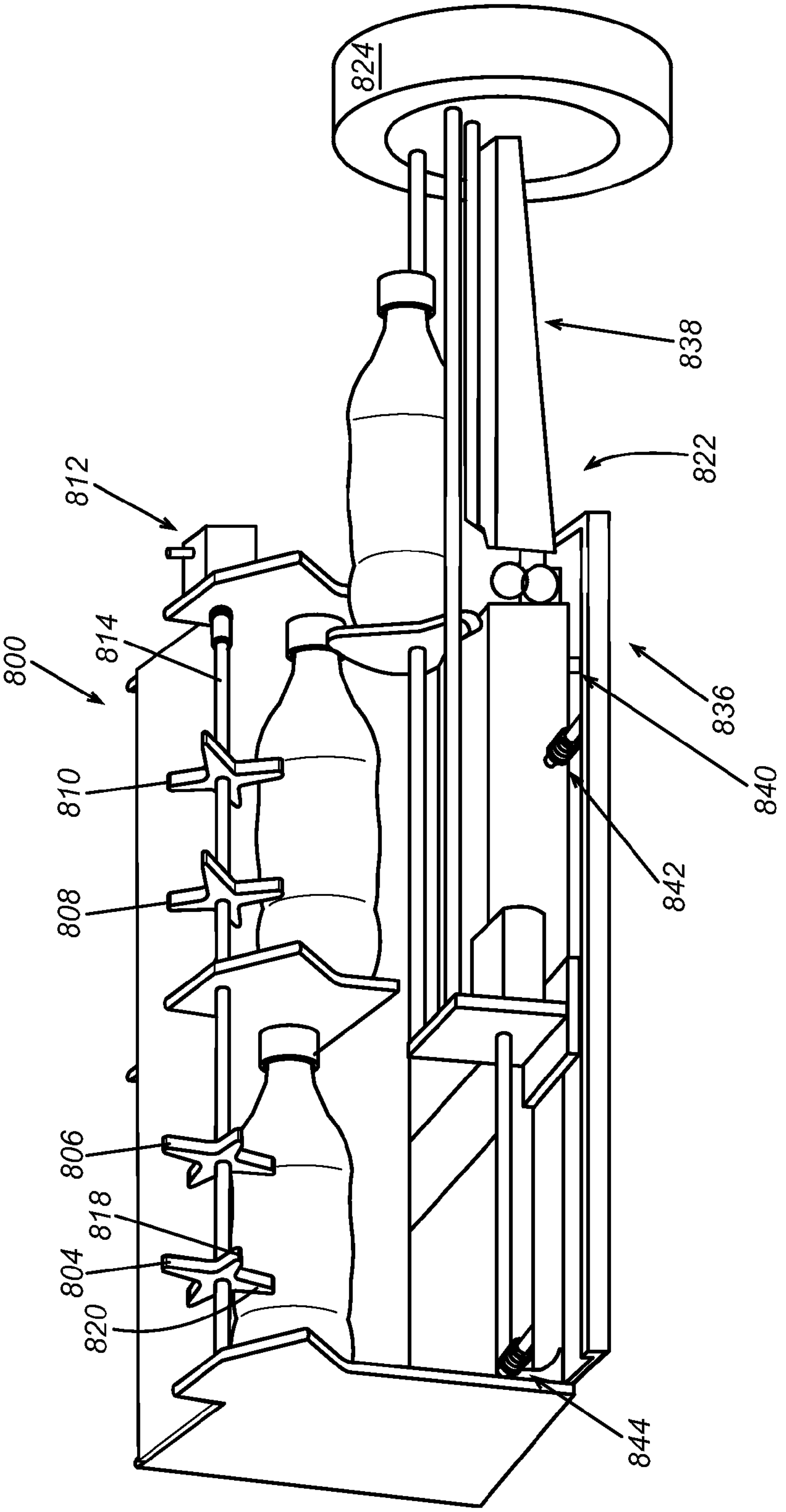
Figure 10:
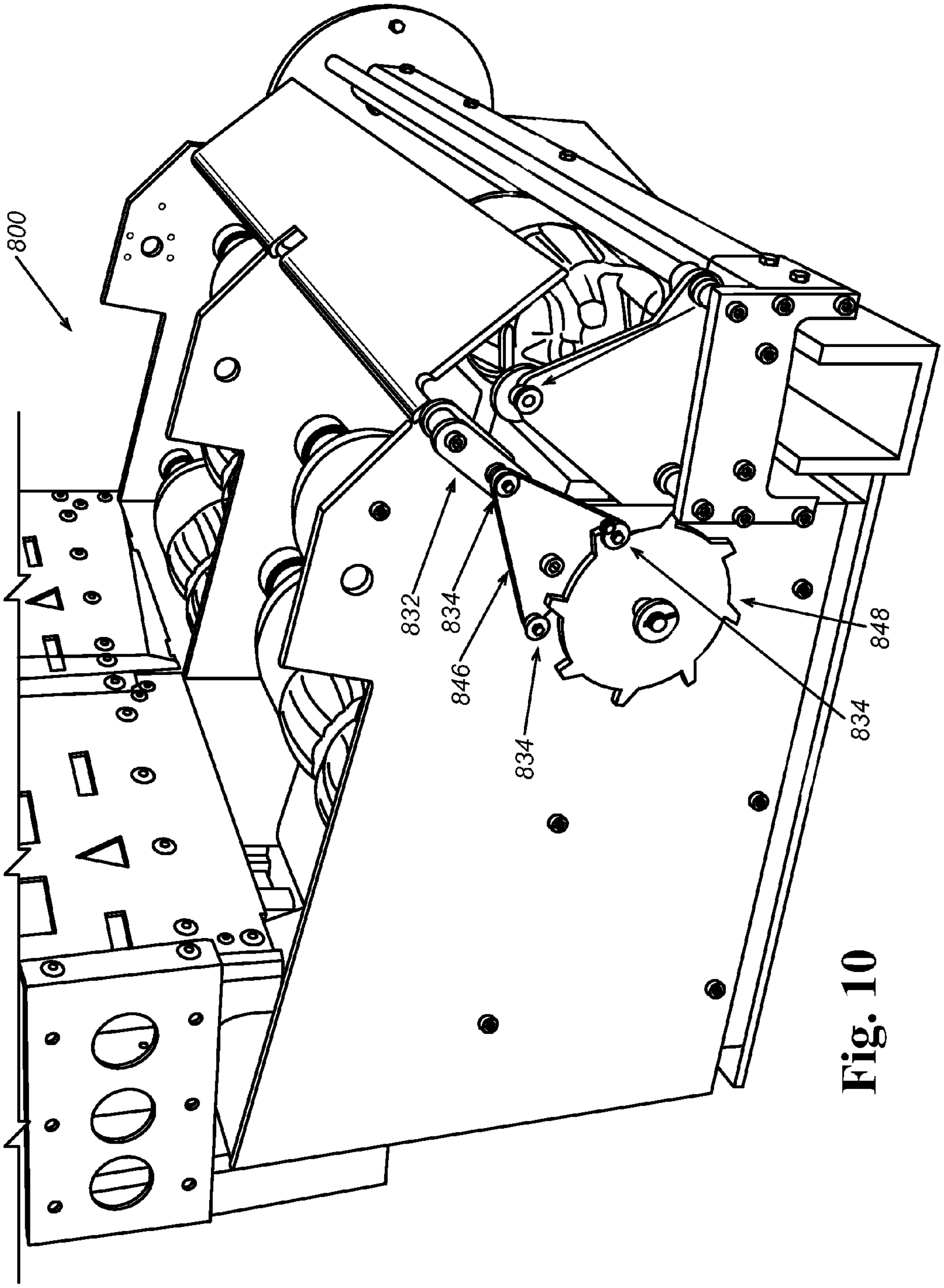

FIGS. 8-10 illustrate another example of a vending dispenser assembly for a beverage dispenser according to an embodiment of the invention.

Figure 11:
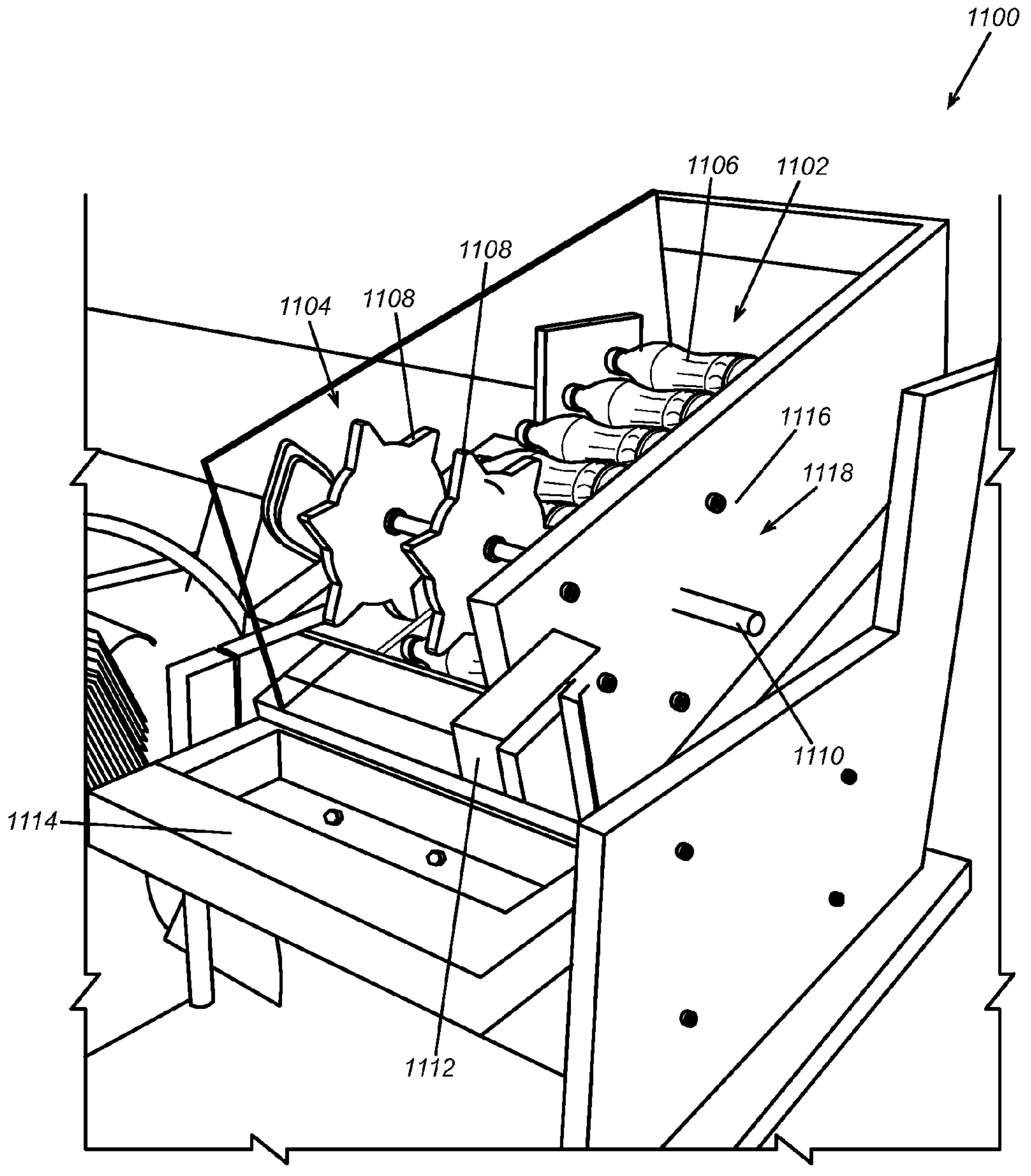

FIG. 11 is an example under the counter-type beverage dispenser with a vending dispenser assembly according to an embodiment of the invention.

Figure 12:
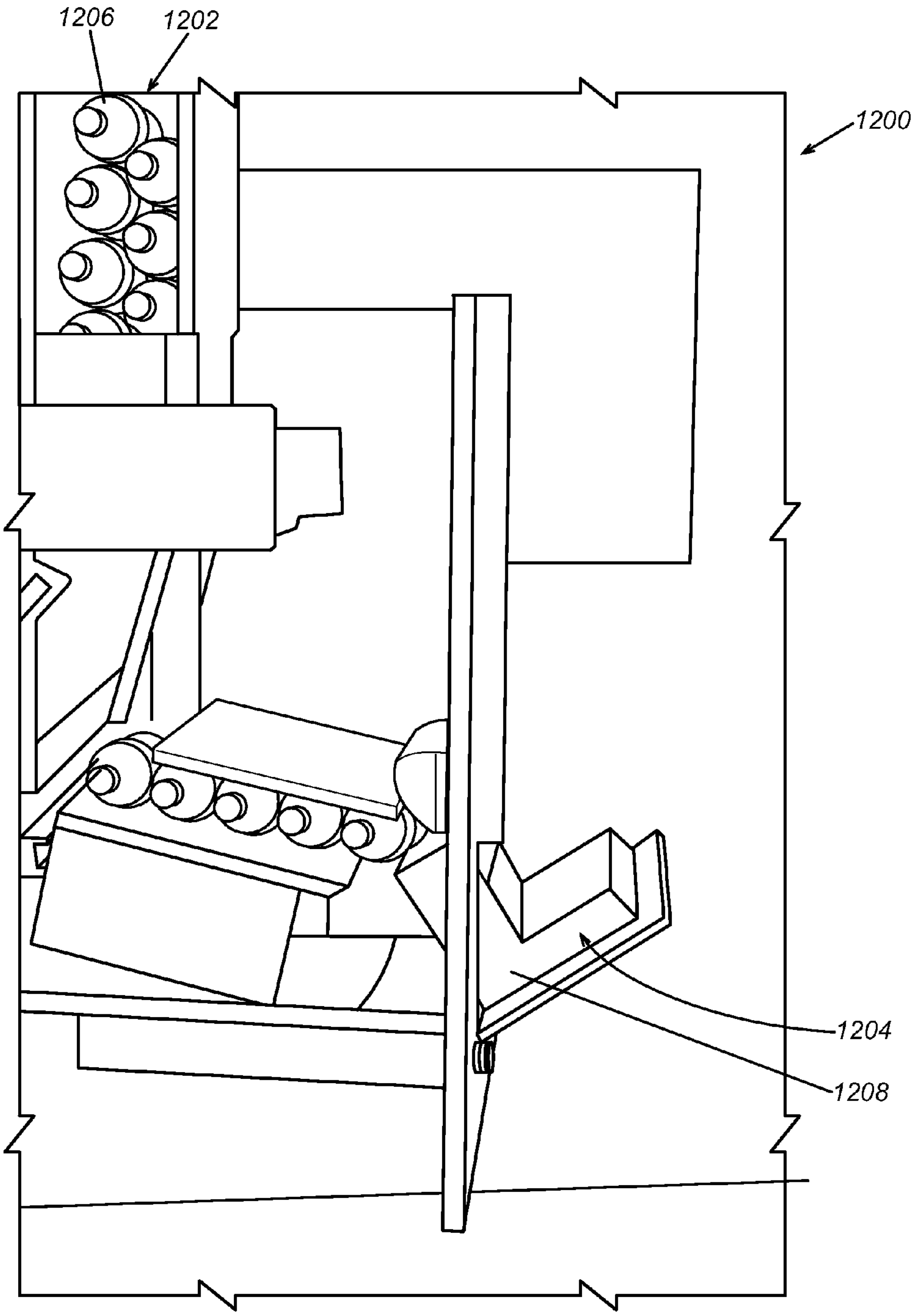

FIG. 12 is a side schematic of an example vending dispenser assembly for a beverage dispenser according to an embodiment of the invention.

Figure 13:
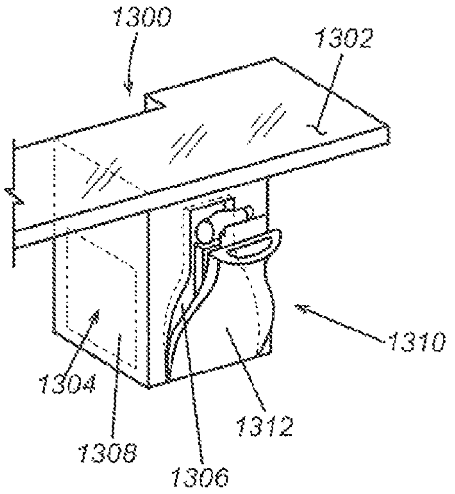

FIG. 13 is a detail side schematic of the example vending dispenser assembly shown in FIG. 11.

Figure 14:
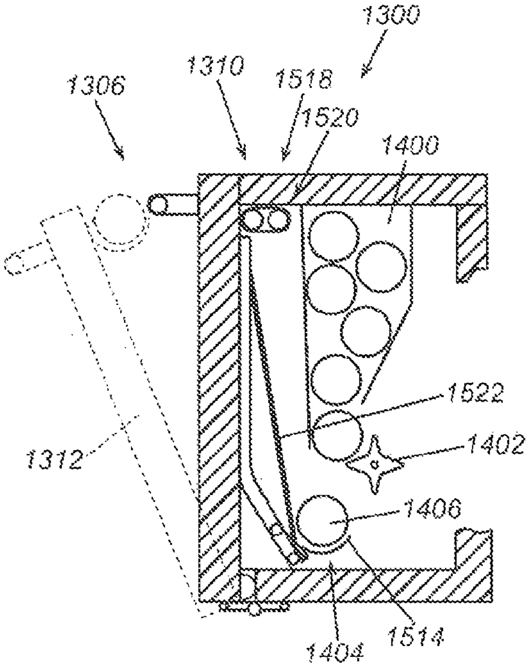

FIG. 14 is another detail side schematic of the example vending dispenser assembly shown in FIG. 11.

Figure 15:
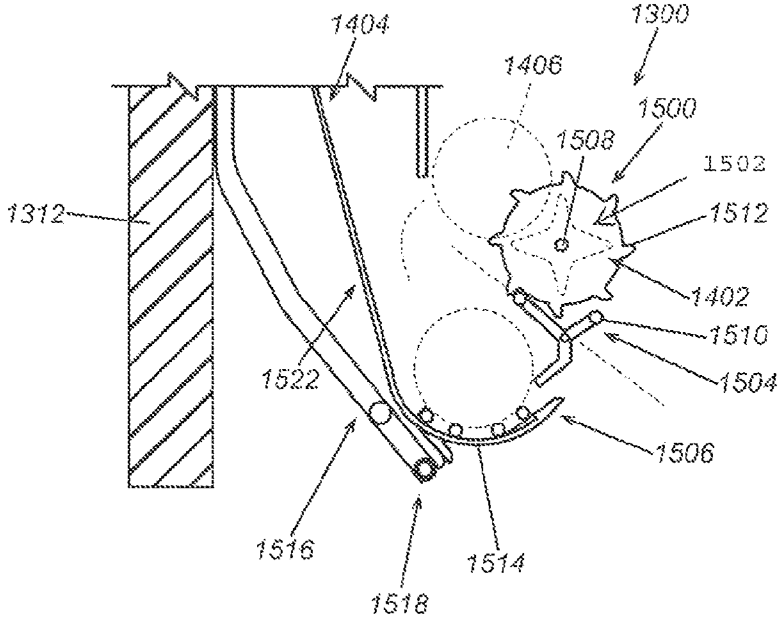

FIG. 15 is a perspective view of another example vending dispenser assembly for a beverage dispenser according to an embodiment of the invention.

Figure 16:
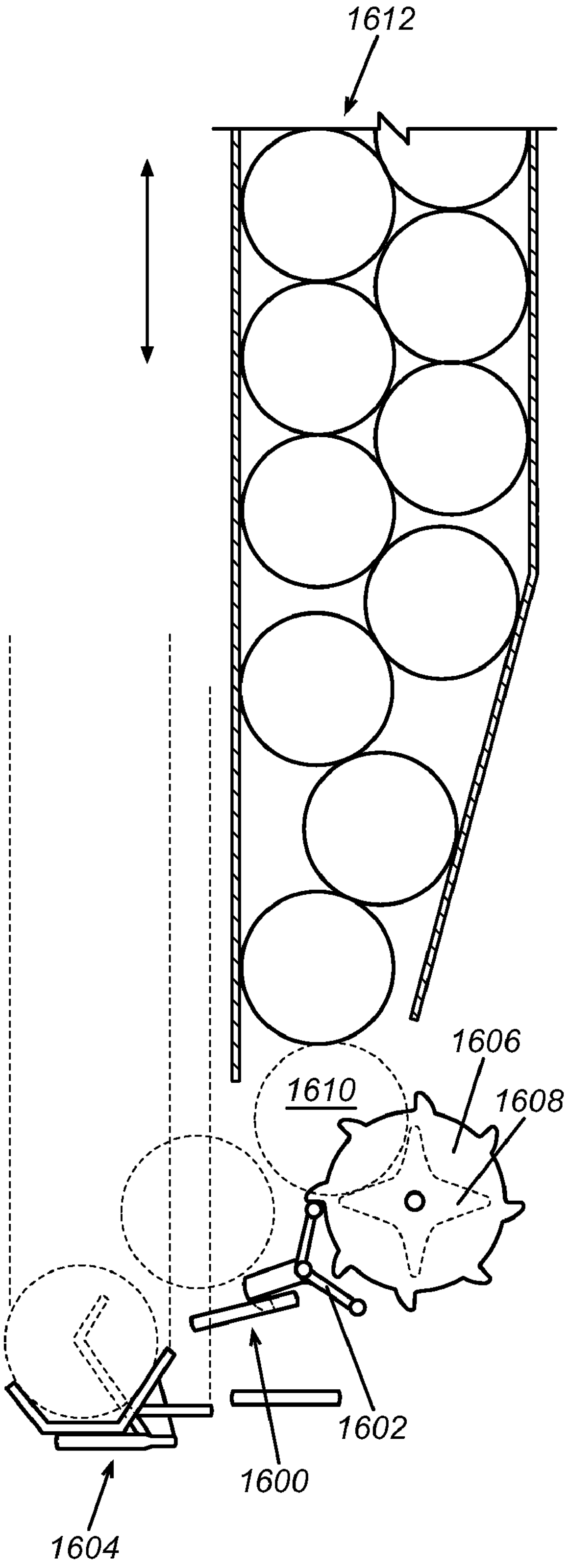

FIG. 16 is a side schematic view of the example vending dispenser assembly shown in FIG. 15.

Figure 17:
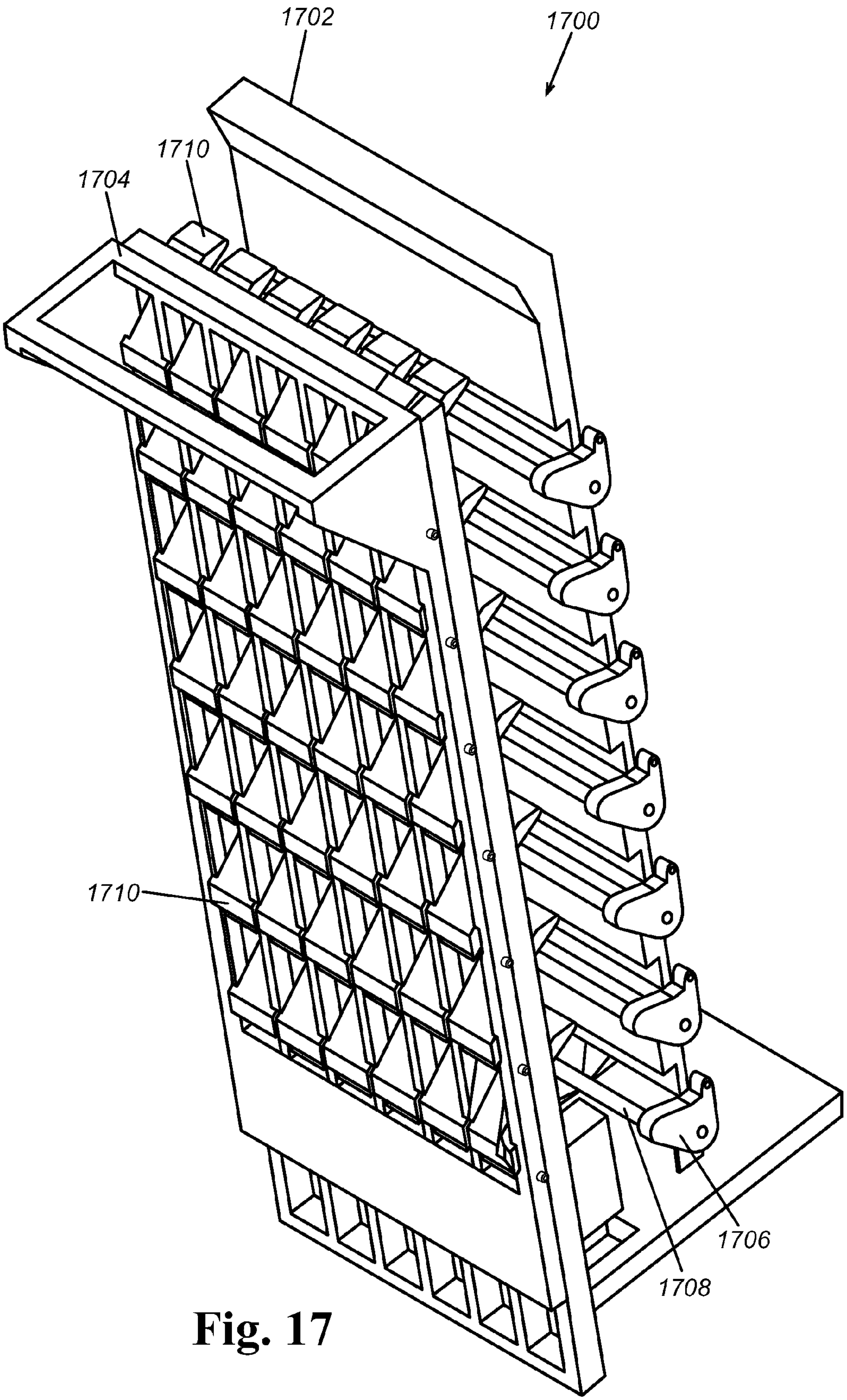

FIG. 17 is a perspective view of another example vending dispenser assembly according to an embodiment of the invention.

Figure 18:
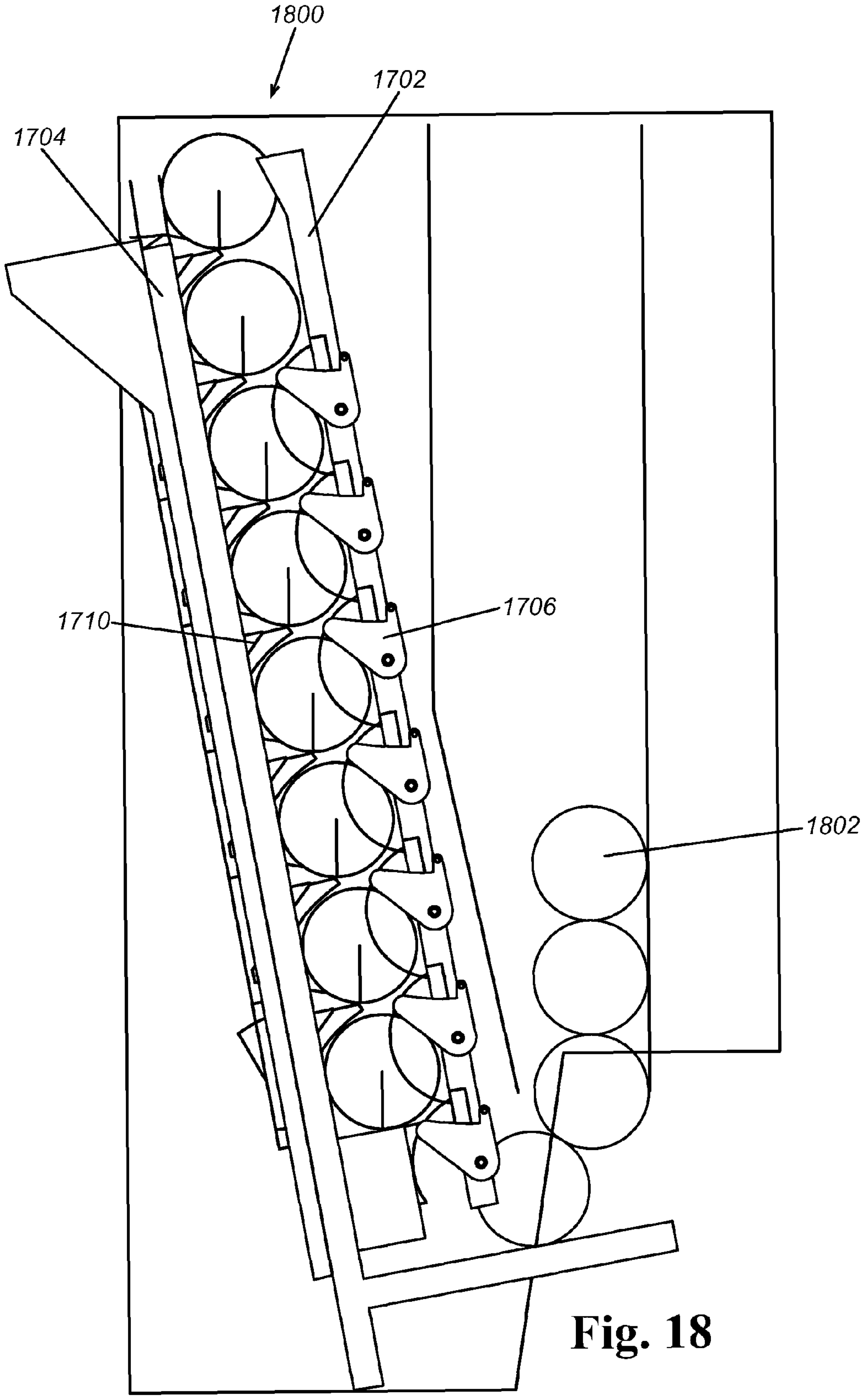

FIG. 18 is perspective view of another example vending dispenser assembly according to an embodiment of the invention.

DETAILED DESCRIPTION OF EMBODIMENTS

Referring now to the drawings, in which like numerals refer to like parts throughout the several views, FIG. 1 shows a perspective view of an example beverage dispenser 100 with a vending dispenser assembly in accordance with an embodiment of the invention described herein. The beverage dispenser 100 shown is a stand alone-type dispenser, which can be mounted in a variety of locations depending on space requirements. Another type of beverage dispenser, an under the counter-type dispenser, is shown and described as 1100 in FIG. 11. Embodiments of a vending dispenser assembly are not limited to, and can be implemented with, either type of beverage dispenser, and with other types of beverage dispensers.

FIG. 2 is a front view, and FIG. 3 is a side view of the stand alone-type beverage dispenser with a vending dispenser assembly shown in FIG. 1. In general, a beverage dispenser, such as 100 in FIG. 1, can include a storage compartment 102, a product identification panel 104, a consumer access opening 106, a personnel access opening 108, and a vending dispenser assembly 110 (shown in the interior of the dispenser 100 in this example). Typically, the beverage dispenser 100 can dispense pre-packaged beverages in cans or other containers. Multiple cans or containers can be loaded into the storage compartment 102 within the dispenser 100 via the personnel access opening 108. FIG. 4 described below illustrates sectional view A-A, wherein further details associated with the storage compartment 102 and vending dispenser assembly 110 are shown. When a consumer is interested in obtaining a beverage from the dispenser 100, the consumer can select a particular beverage from the product identification panel 104. Upon selection of the beverage or payment for the beverage, the vending dispenser assembly 110 can be manipulated to dispense the selected beverage from the storage compartment 102. FIG. 5 described below illustrates sectional view B-B, wherein further details associated with the vending dispenser assembly 110 are shown. In this example, the vending dispenser assembly 110 can be manually manipulated by a user to dispense the selected beverage from the storage compartment 102. The vending dispenser assembly 110 can receive the selected beverage from the storage compartment 102, and can transfer the selected beverage to the consumer access opening 106, where the consumer can obtain the selected beverage.

Other embodiments of a stand alone-type beverage dispenser can include some or all of the above components, and some embodiments can include other components in accordance with an embodiment of the invention.

FIG. 4 shows front sectional view A-A of the beverage dispenser 100 and the storage compartment 102. As shown in FIG. 4, the beverage dispenser 100 can have one or more product lanes or columns 400 within the storage compartment 102. In this example, there are three columns 402, 404, 406 separated by vertically-oriented partitions 408, 410 between columns 402, 404, 406. Within each column 402, 404, 406, multiple beverage containers 412, such as bottles or cans, can be arranged for gravity-fed type dispensing from the respective column. Different types of beverages, such as different flavors or drinks, can be organized between columns. That is, bottles of a regular soft drink can be in one column, bottles of a diet soft drink can in the adjacent column, and bottles of another flavor drink can in the other third column. In any instance, the columns 402, 404, 406 are adapted to receive multiple containers, and by way of gravity, the containers 412 can be channeled towards the vending dispenser assembly 110 adjacent to a lower portion of the respective column 402, 404, 406.

FIG. 5 shows side sectional view B-B of the beverage dispenser 100 and the vending dispenser assembly 110. As shown in this view, containers 500 from a column 502 are gravity fed and channeled towards the vending dispenser assembly 110. The vending dispenser assembly 110 can receive containers from the column 502, and direct a particular beverage container 504 towards the consumer access opening 106 in accordance with a consumer's beverage selection.

As shown in FIG. 6, which is a detail schematic view of the example vending dispenser assembly shown in FIGS. 1-5, the assembly 110 can include a rotatable device, such as a turret 600 with multiple slots 602, 604, 606, 608, and a control device, such as an actuating arm 610, adapted to control the rotation of the rotatable device or turret. In one embodiment, the turret 600 can generally be cylindrically-shaped with multiple spaced apart slots 602, 604, 606, 608 molded or machined into the surface of the turret 600. Each slot 602, 604, 606, 608 can be sized to receive a single beverage container 612. In another embodiment, the rotatable device or turret 600 may include multiple turrets or star-shaped wheels mounted on an axle. The multiple turrets or star-shaped wheels may cooperate to receive one beverage container, such as 612, at a time.

FIGS. 7A and 7B illustrate an example rotatable device or turret for a vending dispenser assembly in accordance with an embodiment of the invention. FIG. 7A shows a perspective view of a cylindrically-shaped turret 700 with multiple slots 702 adapted to receive a beverage container from one column, such as 402, and multiple out-of-phase slots 704 adapted to receive a beverage container from a second or different column, such as 404. The out-of phase slots 704, also shown in the side or cross-sectional view of turret 700 in FIG. 7B, can receive containers from a different column at a different time, when the turret 700 is rotated, and an out-of-phase slot 704 is aligned with it corresponding column. In other embodiments, additional out-of-phase slots adapted to receive a beverage container from other columns at other times can exist, and can be integrated within a single turret, or similarly sized turrets positioned axially adjacent to the turret 700 shown.

Turning back to FIG. 6, the control device is shown as an actuating arm 610. An external portion 614 of the actuating arm 610 can be part of or in communication with the product identification panel, shown as 104 in FIGS. 1 and 2. An internal portion 616 of the actuating arm 610 can be in contact with a portion of the rotatable device, such as a turret 600, to control, limit, or otherwise permit selective rotation or movement of the rotatable device or turret 600. For example, in an initial position, the internal portion 616 of the actuating arm 610 may prevent further rotation of the turret 600 until the arm 610 is released or actuated. When the external portion 614 of the actuating arm 610 receives sufficient force, such as a manual force applied by a user towards the beverage dispenser 100 or actuating arm 610, the actuating arm 610 can pivot slightly to another position to permit the internal portion 616 of the arm 610 to release from or otherwise decrease the amount of force applied by the arm 610 to a surface, such as the slot 608, of the rotatable device or turret 600. Thus, when the arm 610 is actuated, the rotatable device or turret 600 can be rotated to permit a container, such as 612, to move from an adjacent column, such as 402, and into a corresponding slot 602 of the turret 600. The rotatable device or turret 600 can be further rotated to permit the rotatable device or turret 600 to direct the container 612 from the slot 608 towards a consumer access opening 106. In this embodiment, the arm 610 may be adapted to have a return action or spring-type force to permit the arm 610 to return to the initial position when little or no force is applied to the external portion 614 of the arm 610.

Other embodiments of a control device or actuating arm 610 can have other configurations or components, and may cooperate with the product identification panel and/or the rotatable device or turret 600 in other or similar manners in accordance with the invention.

FIGS. 8-10 illustrate another example of a vending dispenser assembly for a beverage dispenser according to an embodiment of the invention. In the embodiment shown, a vending dispenser assembly 800 can include a rotatable device, such as a turret 802 with multiple wheels 804, 806, 808, 810, and a control device, such as a bevel gear set 812, adapted to control the rotation of the rotatable device or turret 802. In one embodiment, the turret 802 can include an axle 814 with multiple spaced apart wheels 804, 806, 808, 810 mounted to the axle 814. Each wheel 804, 806, 808, 810 can generally be cross or star-shaped, and can further be sized to receive a single beverage container 816 between two cross or star arms, such as 818, 820. In another embodiment, the rotatable device or turret 802 may include a generally cylindrical shaped device with multiple slots molded or machined into the device or turret 802.

The embodiment of a vending dispenser assembly shown in FIGS. 8-10 also includes a shuttle assembly 822 adapted to direct a container received from the rotatable device or turret 802 towards a consumer access opening, such as 824. As shown, the shuttle assembly 822 can include a shuttle 826 positioned on at least one rail or track 828. When a user manipulates or pulls on an associated shuttle handle (not shown), the shuttle 826 can ride along the rail or track 828 to direct a container 816 on the shuttle 826 towards a consumer access opening, such as 824, to provide consumer access to the container 816. When an empty shuttle 826 is returned, by either a return force or other force applied by a user, a product gate 830 can swing forward by the force of gravity such that a gate lever 832 pivots and associated drive pins 834 can cooperate to allow the turret 802 and the star wheels 804, 806, 808, 810 to rotate and dispense another container 816 onto the shuttle 826 for directing towards the consumer access opening 824.

The shuttle 826 shown in FIGS. 8-10 can be operated via a drive belt assembly or similar type of drive. A drive assembly 836, including a belt 838, drive gear 840, pulley 838, and door pulley 840, can pull the shuttle 826 towards or away from the consumer access opening 824 as needed. Other drive assembly components, such as a drive stop 840, drive spring 842, and shuttle spring 844 can cooperate to pull the shuttle 826 towards or away from the consumer access opening 824. Other embodiments of a shuttle assembly can have other types of drive configurations or components, and may cooperate with the rotatable device or turret 802 or other parts of a vending dispenser assembly in other or similar manners in accordance with the invention.

The product gate 830 shown in FIGS. 8 and 10 can cooperate with various components including a gate lever 832, drive pins 834, a pivot positioner arm 846, and positioner gear 848. These components can cooperate to permit the product gate 830 to limit the transfer of containers to the shuttle 826. Other embodiments of a product gate can have other types of drive configurations or components, and may cooperate with the rotatable device or turret 802, and shuttle 826, or other parts of a vending dispenser assembly in other or similar manners in accordance with the invention.

FIG. 11 illustrates another example of a vending dispenser assembly in accordance with an embodiment of the invention. This example assembly 1100 can be implemented with a stand alone-type beverage dispenser similar to the dispenser shown as 100 in FIG. 1. The assembly 1100 shown includes at least one product storage column 1102, and a product selection device 1104. Similar to the example in FIG. 4, this assembly 1100 can include one or more columns 1102 separated by vertically-oriented partitions between columns. Within each column 1102, multiple beverage containers 1106, such as bottles or cans, can be arranged for gravity-fed type dispensing from the respective column. By way of gravity, the containers 1106 can be channeled towards the product selection device 1104 adjacent to a lower portion of the respective column 1102.

The product selection shown 1104 can include a series of rotatable devices or turrets 1108 mounted to an axle 1110. A push button-type device 1112 can be manipulated by a user to rotate the axle 1110, thereby rotating the series of rotatable devices or turrets 1108 to permit at least one container 1106 to be dispensed from the column 1102 and towards an access opening or door 1114. Various configurations for a push button-type device 1112 can be used with embodiments of the invention, such as a ratchet-type gear device or other similar device. In the example shown, the push button-type device 1112 can include an arm 1116 that selectively engages an external rotatable device or turret 1118. When the arm 1116 disengages a portion of the external turret 1118, such as disengaging a tooth or notch in the turret 1118, the axle 1110 can rotate. When the arm 1116 engages a portion of the external turret 1118, such as engaging a tooth or notch in the turret 1118, the axle 1110 is prevented or otherwise limited from rotating. In this example, the arm 1116 can be manually manipulated by a user to dispense a selected beverage container, such as 1106, from the column 1102.

FIG. 12 illustrates another example of a vending dispenser assembly in accordance with an embodiment of the invention. This example assembly 1200 can be implemented with a stand alone-type beverage dispenser similar to the dispenser shown as 100 in FIG. 1. The assembly 1200 shown includes at least one product storage column 1202, and a product selection device 1204. Similar to the example in FIG. 4, this assembly 1200 can include one or more columns 1202 separated by vertically-oriented partitions between columns. Within each column 1202, multiple beverage containers 1206, such as bottles or cans, can be arranged for gravity-fed type dispensing from the respective column. By way of gravity, the containers 1206 can be channeled towards the product selection device 1204 adjacent to a lower portion of the respective column 1202.

The product selection device 1204 shown can include a rotatable device or pivoting door 1208. The pivoting door 1208 can be manipulated by a user to permit at least one container 1206 to be dispensed from the column 1202 and towards an access opening and door 1208. In this example, the pivoting door 1208 can be manually manipulated by a user to dispense the selected beverage, such as 1206, from the column 1202. Various configurations for a rotatable device or pivoting door 1208 can be used with embodiments of the invention, such as a gate or other type of selective access door. In the example shown, the pivoting door 1208 can include a specific geometry, such as an angled surface, that permits the door 1208 to rotate to receive a single container 1206 from the column 1202, while maintaining other containers in the column 1202 for subsequent dispensing. Furthermore, the geometry of the door 1208 permits the door 1208 to rotate in another direction to permit access to the dispensed container 1206.

FIG. 13 is an example under the counter-type beverage dispenser with a vending dispenser assembly according to an embodiment of the invention. The beverage dispenser 1300 shown can be mounted in a variety of locations depending on space requirements, such as beneath a countertop 1302 in a retail establishment. In general, an under the counter-type beverage dispenser, such as 1300 in FIG. 13, can include a storage compartment 1304, a consumer access opening 1306, a maintenance door 1308, and a vending dispenser assembly 1310 (shown in the interior of the dispenser 1300 in this example). Typically, the beverage dispenser 1300 can dispense pre-packaged beverages in cans or other containers. Multiple cans or containers can be loaded into the storage compartment 1304 within the dispenser 1300 via the maintenance opening 1308. FIGS. 14 and 15 described below illustrate side and detail views, wherein further details associated with the storage compartment 1304 and vending dispenser assembly 1310 are shown. When a consumer is interested in obtaining a beverage from the dispenser 1300, the consumer or retail personnel can manipulate an access door 1312 to access a beverage within the consumer access opening 1306. In this example, the vending dispenser assembly 1310 can be manually manipulated by a user to dispense the selected beverage from the storage compartment 1304. Upon opening the access door 1312, the vending dispenser assembly 1310 can direct a beverage stored in the storage compartment 1304 towards the access door 1312. The consumer or retail personnel can obtain the beverage from the consumer access opening 1306.

Other embodiments of an under the counter-type beverage dispenser can include some or all of the above components, and some embodiments can include other components in accordance with an embodiment of the invention.

FIG. 14 is a side schematic of an example vending dispenser assembly for a beverage dispenser according to an embodiment of the invention. The beverage dispenser 1300 shown includes an access door 1312, an access opening 1306, one or more product columns 1400, and a vending dispenser assembly 1310 including one or more turret assemblies 1402 and a shuttle assembly 1404. In this example, similar to the beverage dispenser described in FIGS. 1-5, multiple product columns 1400 can be separated by vertically-oriented partitions between columns. Within each column 1400, multiple beverage containers 1406, such as bottles or cans, can be arranged for gravity-fed type dispensing from the respective column. By way of gravity, the containers 1406 can be channeled towards the vending dispenser assembly 1400 adjacent to a lower portion of the respective column.

FIG. 15 shows a detail side view of the beverage dispenser 1300 and the vending dispenser assembly 1310. As shown in this view, containers from a column 1400 are gravity fed and channeled towards the vending dispenser assembly 1310. The vending dispenser assembly 1310 can receive containers from the column 1400, and direct a particular beverage container such as 1406 towards the access opening 1306 when needed. The vending dispenser assembly 1310 can include a rotatable device, such as a turret 1402 with multiple slots, such as 1500. In addition, the vending dispenser assembly can include a control device, such as a combination ratchet gear 1502, toggle 1504, and pawl 1506, adapted to control the rotation of the rotatable device or turret. In one embodiment, the turret 1402 can generally be star-shaped with multiple spaced apart slots, such as 1500, molded or machined into the surface of the turret 1402. Each slot 1500 can be sized to receive a single beverage container, such as 1406. The rotatable device or turret 1402 may include multiple turrets or star-shaped wheels mounted on an axle, such as 1508. The multiple turrets or star-shaped wheels may cooperate to receive one beverage container, such as 1406, at a time. Similar to the turret shown in FIGS. 7A and 7B, a rotatable device or turret 1402 in the embodiment shown in FIGS. 14 and 15 can include multiple out-of-phase slots adapted to receive a beverage container from one or more other columns. When the turret 1402 is rotated, the out-of phase slots can receive containers from other or different columns at different times when each out-of-phase slot is aligned with a corresponding column.

In this embodiment, the control device shown is a combination ratchet gear 1502, toggle 1504, and pawl 1506. The example ratchet gear 1502 can be mounted to the turret 1402, and rotation of the ratchet gear 1502 can transmit a corresponding rotation on the turret 1402 and corresponding slots such as 1500, and any out-of phase slots. A portion of the toggle 1504, such as an arm 1510, can extend towards and contact a portion of the ratchet gear 1502, such as a tooth 1512. The toggle 1504 is adapted to control, limit, or otherwise permit selective rotation or movement of the ratchet gear 1502 as needed. As the toggle 1504 is rotated, other extended portions or arms can contact other teeth of the ratchet gear 1502. For example, in an initial position, the extended arm 1510 of the toggle 1504 may limit or otherwise prevent further rotation of the ratchet gear 1502 and turret 1402 until the arm 1510 is released or actuated. When the toggle 1504 receives sufficient force, such as a manual force applied towards the beverage dispenser 1300 or toggle 1504, the extended arm 1510 can pivot slightly to another position to permit the toggle 1504 to release from or otherwise decrease the amount of force applied by the arm 1510 to a surface, such as tooth 1512, of the ratchet gear 1502. Thus, when the extended arm 1510 is actuated, the rotatable device or turret 1402 can be rotated to permit a container, such as 1406, to move from an adjacent column, such as 1400, and into a corresponding slot 1500 of the turret 1402. The ratchet gear 1502 and rotatable device or turret 1402 can be further rotated to permit the rotatable device or turret 1402 to direct the container 1406 from the slot 1500 towards the shuttle assembly 1404 for further manipulation towards the consumer access opening 1306. In this example, the vending dispenser assembly 1310 can be manually manipulated by a user to dispense the selected beverage from the product column 1400 as needed.

The cradle assembly shown in FIGS. 14 and 15 includes a shuttle 1514, a shuttle track 1516, a shuttle drive assembly 1518 including a set of pulleys 1520 and a drive cable 1522. These components can cooperate together such that when the access door 1312 is manually opened by a consumer or retail personnel, the shuttle 1514 and a single container, such as 1406, can be manipulated upward from the lower portion of the column 1400 towards the consumer access opening 1306.

In the embodiment shown in FIG. 15, the pawl 1506 can be an extended portion of the shuttle 1514 associated with the shuttle assembly 1404. The pawl 1506 can be adapted to cooperate with the toggle 1504 when the shuttle assembly 1404 is available to receive a container, such as 1406. That is, when there is no container being transferred by the shuttle assembly 1404, the pawl 1506 can be in position to actuate the toggle 1504 to permit rotation of the ratchet gear 1502 and turret 1402 until a container 1406 is released from a column, such as 1400, to the shuttle assembly 1404. After a container 1406 is released from the column 1400 to the shuttle assembly 1404, the pawl 1506 can be positioned to limit or stop further rotation of the ratchet gear 1502 and turret 1402. For example, as shown in FIG. 15, the pawl 1506 can include a pivotable or actuating portion adjacent to a shuttle 1514 of the shuttle assembly 1404.

Other embodiments of a control device or combination ratchet gear 1502, toggle, 1504, and pawl 1506 can have other configurations or components, and may cooperate with the rotatable device or turret 1402 in other or similar manners in accordance with the invention. For example, as shown in FIG. 16, a pawl trigger 1600 or other pawl-type device may be associated with a toggle 1602 rather than a shuttle, such as 1520 or 1604, and the shuttle 1604 may pivot depending on whether a container is loaded on the shuttle 1604. In this example, the shuttle may assume an initial, pivoted position when there is no container loaded on the shuttle 1604. When the shuttle 1604 is manipulated in an upward direction, an extended portion of the shuttle 1604 can actuate the pawl trigger 1600 to actuate the toggle 1602 and permit rotation of the ratchet gear 1606 and associated turret 1608. Rotation of the turret 1608 permits a single container 1610 to be transferred from a column 1612 to the shuttle 1604, and loading of the shuttle 1604 can cause the shuttle 1604 to pivot to an upright, relatively horizontal position. After the container 1610 is loaded onto the shuttle 1604, and the shuttle 1604 be moved upward along a shuttle track and clear the pawl trigger 1600 without contacting with the trigger 1600. In this manner, the pawl trigger 1600 and toggle 1602 can limit or otherwise prevent further rotation of the ratchet gear 1606 and turret 1608 until the pawl trigger 1600 is further actuated by the shuttle 1604. This permits the shuttle 1604 and container 1610 to be manipulated or lifted upward for dispensing to a consumer or retail personnel. After the container 1610 is removed from the shuttle 1604, the shuttle 1604 returns to an initial, pivoted position, and the pivoted shuttle 1604 can be moved downward along a shuttle track to receive another container from the column 1612. As the pivoted shuttle 1604 approaches the pawl trigger 1600, the pawl trigger 1600 can be actuated upon contact with the pivoted shuttle 1604. The actuation of the pawl trigger actuates the toggle 1602 and permits rotation of the ratchet gear 1606 and associated turret 1608 such that another container can be transferred from the column 1612 to the shuttle 1604 for subsequent dispensing to a consumer or retail personnel.

FIG. 17 is a perspective view of another example vending dispenser assembly for a beverage dispenser according to an embodiment of the invention. The example vending dispenser assembly 1700 shown in FIGS. 17 and 18 can be implemented with an under the counter-type beverage dispenser, similar to 1300 in FIG. 13, and according to an embodiment of the invention. As shown in FIG. 18, which is a side schematic view of the example vending dispenser assembly shown in FIG. 17, the vending dispenser assembly 1700 can operate adjacent to one or more product columns 1800. In this example, similar to the beverage dispensers described in FIGS. 1-5, and 6-16, multiple product columns 1800 can be separated by vertically-oriented partitions between columns. Within each column 1800, multiple beverage containers 1802, such as bottles or cans, can be arranged for gravity-fed type dispensing from the respective column. By way of gravity, the containers 1802 can be channeled towards the vending dispenser assembly 1700 adjacent to a lower portion of the respective column.

The vending dispenser assembly shown can include at least one moveable array 1702 and at least one stationary array 1704. The moveable array 1702 shown can include a series of pivotable lift arms or extensions 1706 and a corresponding series of lift bars 1708 which are mounted to the lift arms or extensions 1706 in a spaced apart relation along a portion of the array 1702. Each bar 1708 can be mounted to at least one arm or extension 1706 mounted adjacent to a lateral side of the array, but in the configuration shown, can be mounted to an arm or extension adjacent to each lateral side of the array. In this example, the extensions 1706 and arms 1708 can be spaced apart to permit at least one container, such as a can or bottle, to be horizontally positioned between adjacent bars 1708.

The stationary array 1704 can include a series of relatively flexible or pivotable arms or extensions 1710 which are spaced apart along a portion of the length of the stationary array 1704. In this example, the extensions 1710 can be spaced apart to permit at least one container, such as a can or bottle, to be horizontally positioned between adjacent extensions 1710. As shown, the moveable array 1702 and stationary array 1704 can be positioned opposing each other such that the respective series of arms or extensions 1706, 1710 of each array 1702, 1704 generally face each other.

As each container in the product column 1800 is directed towards the vending dispenser assembly 1700, the moveable array 1702 can be positioned to receive at least one container 1802 from the lower portion of the column 1800 such that the container 1802 is oriented adjacent to the lift bar 1708 and between adjacent extensions 1706. As the moveable array is manipulated upward by a consumer or retail personnel, the container 1802 is directed upward between the moveable array and the stationary array such that the container 1802 contacts a portion of at least one relatively flexible or pivotable arm or extension 1710 associated with the stationary array 1704. As the container contacts the flexible or pivotable arm or extension 1710, the extension flexes or pivots from an initial position towards a flexed or pivoted position to permit the container to continue traveling upward. After the container has traveled further, the extension 1710 returns or pivots back to the initial position. In this manner, the container can be retained at a certain position by the extensions of the stationary array if the moveable array is manipulated downward, or if the moveable array continues to move upward, the container can continue to be directed upward past one or more flexible or pivotable arm or extensions associated with the stationary array. Furthermore, in this example, the vending dispenser assembly 1700 can be manually manipulated by a user to dispense a selected beverage from the product column 1800.

Other embodiments of a moveable array and stationary array for a vending dispenser assembly can have other types of array configurations or components, and may cooperate with each other, or other parts of a vending dispenser assembly in other or similar manners in accordance with the invention.

It should be apparent to one of ordinary skill in the art that the foregoing relates only to embodiments of the invention and that numerous changes and modifications can be made herein without departing from the scope of the invention as defined by the following claims and equivalents thereof.

The claimed invention is:

1. A dispenser for dispensing a number of products, comprising:

at least one storage column adapted to dispense a number of products;

a product selection device operable to permit one of the number of products to advance from the storage column, wherein the advanced product can be dispensed from the dispenser, the product selection device comprising at least one turret-type wheel positioned adjacent to at least one storage column;

an access opening; and a product shuttle cooperating with the door and the at least one turret-type wheel, wherein manipulating the access door causes rotation of the at least one turret-type wheel which allows one of the number of products to advance from the at least one storage column to the product shuttle and towards the access opening, wherein manipulating the access door from an initial vertically oriented position further causes the product shuttle to lift the advanced product along at least a portion of the access door for dispensing from the dispenser.

2. A dispenser for dispensing a number of products, comprising:

at least one storage column adapted to dispense a number of products;

a product selection device operable to permit one of the number of products to advance from the storage column, wherein the advanced product can be dispensed from the dispenser; and wherein the product selection device comprises:

at least one moveable array operable to receive the advanced product, and advance the product towards an access opening; and at least one stationary array adjacent to the at least one moveable array, and operable to retain the position of the advanced product when movement of the advanced product is interrupted prior to dispensing of the product from an access opening; and an access opening for dispensing the advanced product wherein the advanced product is moved upward by the at least one moveable array for dispensing from the dispenser.

3. A dispenser for dispensing a number of products, comprising:

at least one storage column adapted to dispense a number of products; and a product selection device operable to permit one of the number of products to advance from the storage column, wherein the advanced product can be dispensed from the dispenser, and wherein the product selection device comprises:

an access door;

at least one turret-type wheel positioned adjacent to at least one storage column, wherein the at least one turret-type wheel comprises a plurality of slots and a plurality of out-of-phase slots, wherein the plurality of slots is sized to receive one of a number of products from a first storage column and the plurality of out-of-phase slots is sized to receive one of a number of products from a different storage column; and a product shuttle cooperating with the door and the at least one turret-type wheel, wherein manipulating the access door causes rotation of the at least one turret-type wheel which allows one of the number of products to advance from the at least one storage column to the product shuttle and towards the access door.

4. A dispenser for dispensing a number of products, comprising:

at least one storage column adapted to dispense a number of products;

a product selection device operable to permit one of the number of products to advance from the at least one storage column, wherein the product selection device comprises:

at least one turret-type wheel positioned adjacent to at least one storage column;

wherein manipulating the access door causes rotation of the at least one turret-type wheel which allows one of the number of products to advance from the at least one storage column to the product shuttle and towards the access door;

an access door; and a product shuttle, wherein manipulating the access door causes one of the number of products to advance from the product selection device to the product shuttle and towards the access door, wherein when the access door is rotated from an initial vertically oriented position, the product shuttle lifts the advanced product along at least a portion of the access door for dispensing from the dispenser.

5. The dispenser of claim 4, wherein the at least one turret-type wheel comprises a plurality of slots, wherein each of the plurality of slots is sized to receive one of the number of products.

6. The dispenser of claim 4, wherein the at least one turret-type wheel comprises a plurality of slots and a plurality of out-of-phase slots, wherein the plurality of slots is sized to receive one of a number of products from a first storage column and the plurality of out-of-phase slots is sized to receive one of a number of products from a different storage column.

7. The dispenser of claim 4, wherein rotation of the at least one-turret type wheel is controlled by at least one control device.

8. The dispenser of claim 7, wherein the at least one control device comprises at least one of the following: a ratchet gear, a toggle, a pawl, or a pawl trigger.

9. The dispenser of claim 4, wherein the product shuttle comprises a pulley drive set.

10. The dispenser of claim 4, wherein the product shuttle is adapted to lift the advanced product when the access door is opened.

11. A dispenser for dispensing a number of products, comprising:

at least one storage column adapted to dispense a number of products;

a product selection device operable to permit one of the number of products to advance from the at least one storage column, wherein the product selection device comprises:

at least one turret-type wheel positioned adjacent to the at least one storage column; and a device cooperating with the at least one turret-type wheel, the device operable to receive a force from a user, wherein the force causes the at least one turret-type wheel to rotate and allows one of the number of products to advance from the at least one storage column;

an access door; and a product shuttle, wherein manipulating the access door causes one of the number of products to advance from the product selection device to the product shuttle and towards the access door, wherein when the access door is rotated from an initial vertically oriented position, the product shuttle lifts the advanced product along at least a portion of the access door for dispensing from the dispenser.

12. The dispenser of claim 11, wherein the at least one turret-type wheel comprises a plurality of slots, wherein each of the plurality of slots is sized to receive one of the number of products.

* * * * *